(12) United States Patent
Beckman et al.

(10) Patent No.: US 11,561,113 B2
(45) Date of Patent: Jan. 24, 2023

(54) CORE-POSITION SENSOR

(71) Applicant: Probe Technology Services, Inc., Fort Worth, TX (US)

(72) Inventors: Marvin Beckman, Mineral Wells, TX (US); Thientu Ho, Arlington, TX (US); Loi Tran, Benbrook, TX (US); Mark Hastings, Weatherford, TX (US); Terry Hendrix, Keller, TX (US)

(73) Assignee: Probe Technology Services, Inc., Fort Worth, TX (US)

( * ) Notice: Subject to any disclaimer, the term of this patent is extended or adjusted under 35 U.S.C. 154(b) by 205 days.

(21) Appl. No.: 16/793,342

(22) Filed: Feb. 18, 2020

(65) Prior Publication Data

US 2020/0264014 A1    Aug. 20, 2020

Related U.S. Application Data

(60) Provisional application No. 62/807,626, filed on Feb. 19, 2019.

(51) Int. Cl.
| | |
|---|---|
| *G01D 5/22* | (2006.01) |
| *E21B 47/00* | (2012.01) |
| *E21B 47/085* | (2012.01) |

(52) U.S. Cl.
CPC .......... *G01D 5/2291* (2013.01); *E21B 47/00* (2013.01); *E21B 47/085* (2020.05)

(58) Field of Classification Search
CPC .... G01D 5/2006; G01D 5/2013; G01D 5/204; G01D 5/2216; G01D 5/2291; E21B 47/00; E21B 47/08; E21B 47/085; H01F 2007/1684; H01F 2007/1692; H01F 2007/185

See application file for complete search history.

(56) References Cited

U.S. PATENT DOCUMENTS

| | | | | |
|---|---|---|---|---|
| 3,189,890 | A * | 6/1965 | Gilbert | H03M 1/00 |
| | | | | 341/11 |
| 4,467,320 | A | 8/1984 | McPhee | |
| 4,644,355 | A * | 2/1987 | Russell | G01D 5/206 |
| | | | | 324/207.16 |
| 4,707,845 | A | 11/1987 | Krein et al. | |
| 4,853,604 | A | 8/1989 | McMullin | |
| 5,010,333 | A * | 4/1991 | Gardner | E21B 47/12 |
| | | | | 340/854.1 |
| 2006/0064889 | A1 | 3/2006 | Fredette et al. | |
| 2007/0013541 | A1* | 1/2007 | Harazin | G08B 13/2474 |
| | | | | 340/8.1 |
| 2009/0013775 | A1 | 1/2009 | Bogath et al. | |

(Continued)

FOREIGN PATENT DOCUMENTS

EP    0229713 A2    7/1987

OTHER PUBLICATIONS

PCT/US2020/018576 International Search Report dated May 7, 2020.

*Primary Examiner* — Steven L Yeninas
(74) *Attorney, Agent, or Firm* — D. Tiller Law PLLC; Donald Tiller

(57) ABSTRACT

A caliper-arm-position sensor comprising a differential variable reluctance transducer (DVRT) and circuits to drive the DVRT with a substantially sinusoidal signal and to sample a signal at the DVRT once per drive-signal cycle at a predetermined position in the drive-signal cycle is disclosed.

18 Claims, 8 Drawing Sheets

(56) References Cited

U.S. PATENT DOCUMENTS

| | | | |
|---|---|---|---|
| 2010/0289506 A1* | 11/2010 | Moon | H03K 17/955 324/681 |
| 2012/0067118 A1* | 3/2012 | Hartog | G02B 6/10 73/152.16 |
| 2012/0176124 A1 | 7/2012 | Szulyk et al. | |
| 2012/0185207 A1 | 7/2012 | Fox et al. | |
| 2013/0113629 A1* | 5/2013 | Hartog | G01V 1/226 340/853.2 |
| 2017/0167244 A1 | 6/2017 | Beckman et al. | |
| 2018/0113037 A1* | 4/2018 | Molteni | G01D 5/35361 |
| 2019/0348206 A1* | 11/2019 | Goers | H01F 7/1844 |
| 2022/0045640 A1* | 2/2022 | Kong | H03M 1/485 |

* cited by examiner

CORE-POSITION SENSOR

CROSS-REFERENCE TO RELATED APPLICATIONS

This application claims priority to U.S. Patent Application No. 62/807,626, filed on Feb. 19, 2019.

TECHNICAL FIELD

This invention pertains generally to technology for measuring the position of the core in a differential variable reluctance transducer. More particularly, the invented technology can be deployed in a caliper to accurately and stably measure the caliper position. For example, the technology may be used in a multi-arm caliper designed to measure the diameter of a wellbore or to measure the corrosion, scaling, or pitting of tubulars (e.g., casing in a wellbore).

BACKGROUND

Caliper tools are often used in the oil-and-gas industry to measure characteristics of the wellbore environment. For example, a multi-arm caliper logging tool may be positioned in a wellbore (e.g., via wireline) to measure the diameter of the wellbore at various depths in the wellbore. The diameter measurement may be taken at various axes to provide a diameter profile. When positioned in a tubular, such as casing in a wellbore, the caliper tool provides information about the condition of the inner wall of the tubular. An overview of caliper tools is provided in Applicant's U.S. Pat. No. 10,087,740, the entirety of which patent is incorporated herein by reference.

One way to determine the radial position of a caliper arm (or "finger") in a caliper logging tool (the distance of a point on the arm from the longitudinal axis defined by the caliper tool) is to mechanically link the position of the arm to the position of a core relative to a transformer or inductor (e.g., in a differential variable reluctance transducer). The electrical signal provided by the transformer/inductor transducer is a function of the position of the core and thus is a function of the position of the arm. An overview of such an approach is provided in U.S. Pat. No. 10,087,740.

The circumferential resolution of a caliper tool may be increased by increasing the number of caliper arms. For example, a 60-arm caliper tool has a greater circumferential resolution than a 40-arm caliper tool which has a greater circumferential resolution than a 24-arm caliper tool. This increased circumferential resolution comes at a cost. Namely, more caliper arms means more data competing for limited processing resources. This manifests in a logging tool as slower logging speeds to allow time to capture data at the various depths within the borehole without degrading depth resolution. Stated another way, to maintain vertical (depth) resolution while increasing circumferential resolution without increasing processing capacity (and, thereby, the size and power requirements of the tool), the logging process will require more time. Accordingly, there is a need for a caliper-position sensor that acquires high-resolution caliper-sensor information quickly so as to reduce the need to increase processing capacity in order to increase circumferential resolution.

SUMMARY

The present invention is directed to technology to satisfy the need for high-resolution (circumferential, radial, and depth), high-speed caliper measurements with small size and power-consumption constraints.

In one aspect of the invention, a sensor includes a transducer having a core and two coils connected in series at a center-tap position. The core and coils are positioned such that movement of the core relative to the coils measurably changes the impedance of each coil. A voltage applied across the coils will yield a voltage at the center-tap that is a function of the impedances of the two coils and thus a function of the position of the core relative to the coils (the coils/core effectively act as a variable voltage divider). The sensor further includes a circuit to differentially drive the transducer with a sinusoidal voltage signal applied to one end and a 180-degree phase-shifted signal applied to the other. This achieves a balanced sensor circuit, with the mid-point core position yielding a zero signal at the center-tap (because the impedance of the two coils are then equal). The drive signal may be a constant current to ensure a stable excitation energy over a wide temperature range. The sensor further includes an analog-to-digital converter ("ADC") to capture the center-tap signal and a circuit to trigger the ADC once per drive-signal cycle at a predetermined time following the zero-crossing of the drive signal. Driving the transducer at a high rate (e.g., 500 kHz) enables multiple center-tap samples in a short period of time. The samples can be decimated to yield a high-resolution, high-speed measurement of core position. In another aspect of the invention, the coils may driven at the center tap and the signals at either end of the coil are differentially analyzed to determine the core position.

In another aspect of the invention, a sensor includes multiple transducers connected to the drive and sampling circuitry through MUX switches. This enables a single drive/sampling circuit to support multiple transducers, which in turn reduces power and size requirements for a multi-transducer sensor (e.g., a multi-arm caliper).

BRIEF DESCRIPTION OF THE DRAWINGS

These and other features, aspects, and advantages of the present invention will be better understood with reference to the following description, appended claims, and accompanying drawings where:

DETAILED DESCRIPTION

Figure 1:
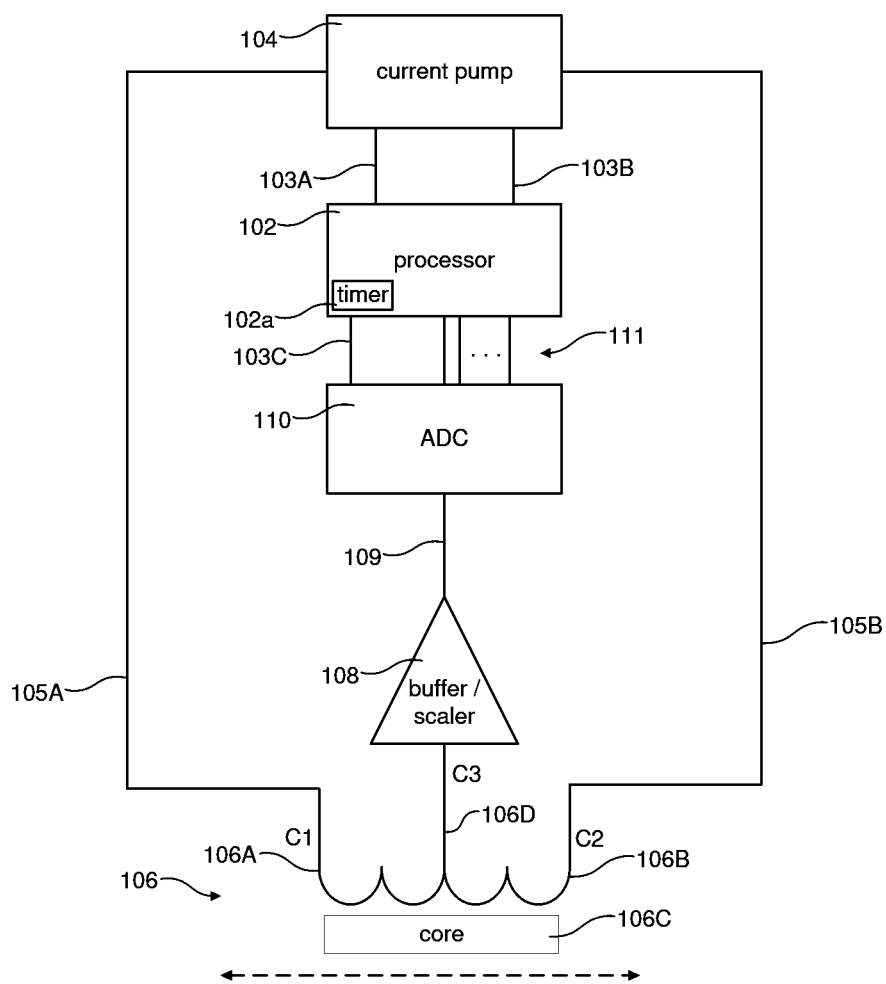
FIG. 1 is a block diagram illustrating an exemplary single-transducer sensor circuit according to an aspect of the invention.

In the summary above, and in the description below, reference is made to particular features of the invention in the context of exemplary embodiments of the invention. The features are described in the context of the exemplary embodiments to facilitate understanding. But the invention is not limited to the exemplary embodiments. And the features are not limited to the embodiments by which they are described. The invention provides a number of inventive features which can be combined in many ways, and the invention can be embodied in a wide variety of contexts. Unless expressly set forth as an essential feature of the invention, a feature of a particular embodiment should not be read into the claims unless expressly recited in a claim.

Except as explicitly defined otherwise, the words and phrases used herein, including terms used in the claims, carry the same meaning they carry to one of ordinary skill in the art as ordinarily used in the art.

Because one of ordinary skill in the art may best understand the structure of the invention by the function of various structural features of the invention, certain structural features may be explained or claimed with reference to the function of a feature. Unless used in the context of describing or claiming a particular inventive function (e.g., a process), reference to the function of a structural feature refers to the capability of the structural feature, not to an instance of use of the invention.

Except for claims that include language introducing a function with "means for" or "step for," the claims are not recited in so-called means-plus-function or step-plus-function format governed by 35 U.S.C. § 112(f). Claims that include the "means for [function]" language but also recite the structure for performing the function are not means-plus-function claims governed by § 112(f). Claims that include the "step for [function]" language but also recite an act for performing the function are not step-plus-function claims governed by § 112(f).

Except as otherwise stated herein or as is otherwise clear from context, the inventive methods comprising or consisting of more than one step may be carried out without concern for the order of the steps.

The terms "comprising," "comprises," "including," "includes," "having," "haves," and their grammatical equivalents are used herein to mean that other components or steps are optionally present. For example, an article comprising A, B, and C includes an article having only A, B, and C as well as articles having A, B, C, and other components. And a method comprising the steps A, B, and C includes methods having only the steps A, B, and C as well as methods having the steps A, B, C, and other steps.

Terms of degree, such as "substantially," "about," and "roughly" are used herein to denote features that satisfy their technological purpose equivalently to a feature that is "exact." For example, a component A is "substantially" perpendicular to a second component B if A and B are at an angle such as to equivalently satisfy the technological purpose of A being perpendicular to B.

Except as otherwise stated herein, or as is otherwise clear from context, the term "or" is used herein in its inclusive sense. For example, "A or B" means "A or B, or both A and B."

An exemplary caliper-arm-position sensor incorporating an embodiment of the invention is depicted in FIG. 1. The sensor includes a differential variable reluctance transducer ("DVRT") 106 comprising two coils 106A, 106B and a core 106C. The windings 106A, 106B are wound about a bobbin and are connected electrically in series to form a compound coil. The coils 106A, 106B consist of the same number of turns and split the winding area of the bobbin in half. In the middle of the bobbin, a center tap lead 106D ("C3") is attached where the coils 106A, 106B are connected together. The core 106C is configured to move relative to the coil 106A/106B and thus change the impedance (and reluctance) of the coils 106A, 106B. The core 106C is mechanically attached to a caliper arm (not shown) such that each unique caliper-arm position corresponds to a unique position of the core 106C relative to the windings 106A, 106B. By measuring a voltage at the center tap, the position of the core 106C relative to the coils 106A, 106B can be inferred (and thus the position of the caliper arm may be inferred).

Each end of the coil is driven with a differential constant-current signal 105A, 105B. The frequency of the differential drive signal 105A, 105B is selected to be exactly the zero phase frequency of the windings of the coils 106A, 106B. For temperature stability of the measurement, the frequency of the drive signal 105A, 105B is set slightly lower than the self-resonant frequency of the DVRT 106. For a drive-signal frequency significantly above the self-resonant frequency of the DVRT 106, the DVRT operates as a low-Q band-pass filter in the capacitive region, resulting in loss of information regarding the position of the core 106C relative to the coils 106A, 106B. For a drive-signal frequency significantly below the self-resonant frequency of the DVRT 106, the DC-coupled instrumentation circuit will be loaded by the inductive reactance of the DVRT 106, resulting in poor electrical efficiency.

Figure 2:
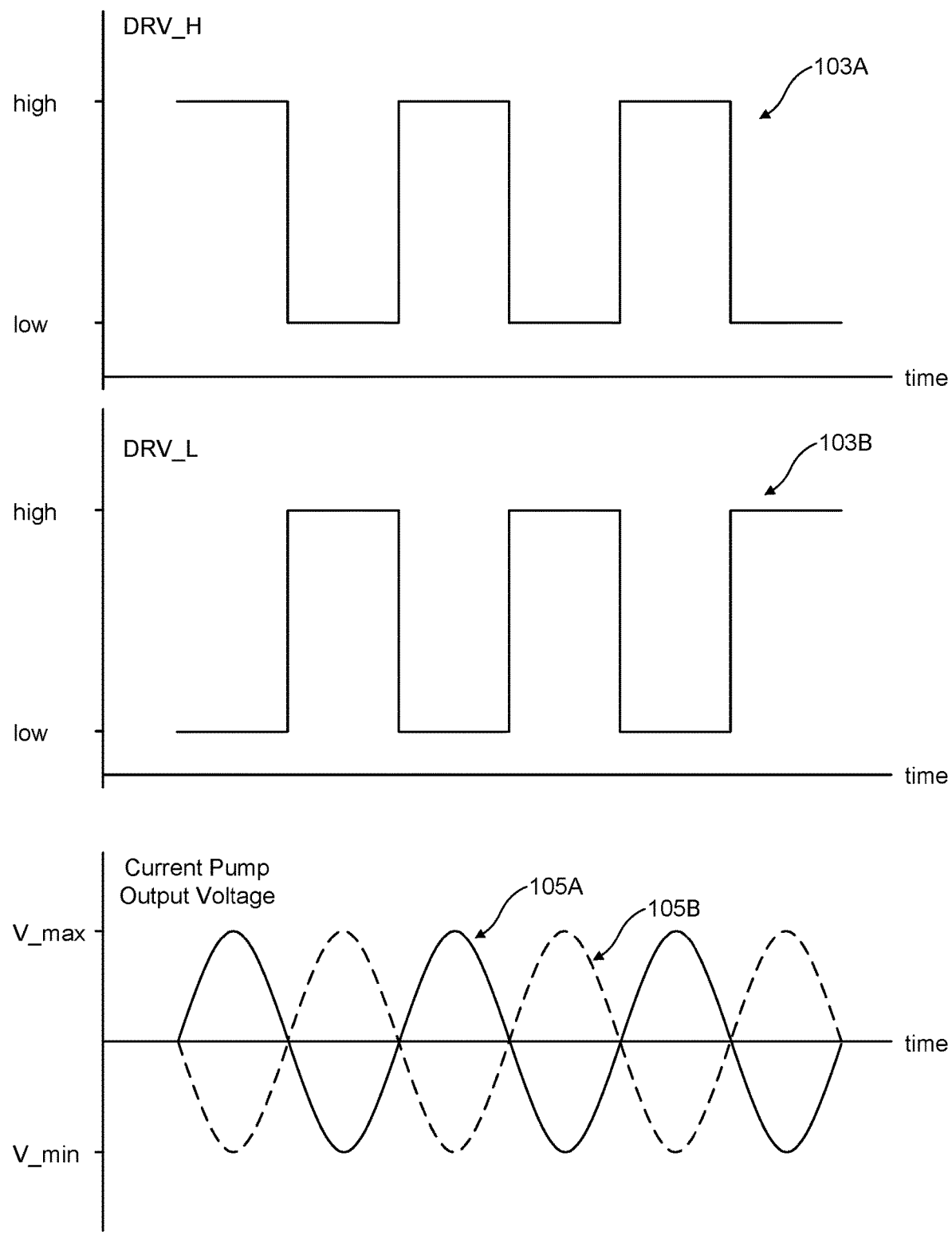
FIG. 2 is a set of timing diagrams illustrating exemplary relative timing of the differential-drive signals used in an exemplary sensor according to an aspect of the invention.

The differential drive signal 105A, 105B is produced by a current-pump 104 and a processor 102 (e.g., a digital-signal processor, "DSP"). The processor 102 drives the pump 104 with a high-drive signal 103A ("DRV_H") and a low-drive signal 103B ("DRV_L"). As depicted in FIG. 2, The DRV_H 103A and DRV_L 103B signals are complementary: DRV_H 103A is high when DRV_L 103B is low and DRV_H 103A is low when DRV_L 103B is high. Also as depicted in FIG. 2, the current pump 104 converts the DRV_H 103A and DRV_L 103B square-wave voltage signals to phase-complementary roughly sinusoidal voltage signals 105A, 105B: the differential drive signal comprises a first sinusoidal signal 105A (solid line) applied to one end of the compound coil 106A/106B (the C1 end) and a second, 180-degree phase shifted, sinusoidal signal 105B (dashed line) applied to the other end of the compound coil 106A/106B (the C2 end). In one exemplary embodiment, the DRV_H signal 103A is a repeated pattern of high for 1 microsecond and low for 1 microsecond for a 500 kHz signal (the DRV_L signal 103B would thus be the inverse pattern, low for 1 microsecond and high for 1 microsecond).

The signal at the center tap 106D of the DVRT is a function of the position of the core 106C relative to the coils 106A, 106B. The center tap 106D is connected to an analog-to-digital converter ("ADC") 110 through a buffer 108. This signal at the center tap 106D is sampled once per drive-signal cycle at a specific moment relative to the zero crossing of the DRV_H/DRV_L drive signal. The ADC 110 is triggered by the processor 102 with a "trigger" signal 103C. At this point, the ADC 110 samples the instantaneous signal from the center tap 106D of the DVRT 106 and provides the information to the processor via a bus 111. The DC value of this signal will track the physical position of the core 106C, resulting in a very accurate, high resolution, non-contact position measurement. This measurement spans two quadrants with an output that reads zero when the core 106C is positioned at one extreme, full scale when the core 106C is positioned at the other extreme, and mid-scale when the core 106C is positioned in the middle of the coil of the DVRT 106. The processor 102 provides a timer 102a for adjustment of the timing of the trigger point of the ADC 110 in order to phase null the system which is made up of the analog and digital circuitry. A delay is required to compensate for the phase shift of the DVRT signal as it passes through the amplifiers of the analog circuitry. For example, the processor 102 may provide an adjustable index register which controls the trigger timing for the ADC 110. In one embodiment, the processor may adjust the timing via application of 16 steps of 22.5 degrees phase, from zero to three-hundred-sixty degrees relative to the starting of the sine wave couplet 105A/105B. Thus, for example, in an embodiment having an analog-portion delay of 45 degrees, the adjustment index would be two steps of 22.5 degrees. By adding eight steps to the index (180-degrees of delay), the measurement will have a negative slope. The delay, and thus the appropriate index, is a function of the analog circuitry to process the signal at the center tap 106D of the DVRT 106. For set circuitry, the index may be set as constant in the processor 102. While FIG. 1 depicts separate circuit blocks, the blocks do not necessarily correspond to distinct devices. For example, ADC 110 and processor 102 may be integrated into a single device (e.g., a DSP with an integrated analog-to-digital converter).

Figure 3:
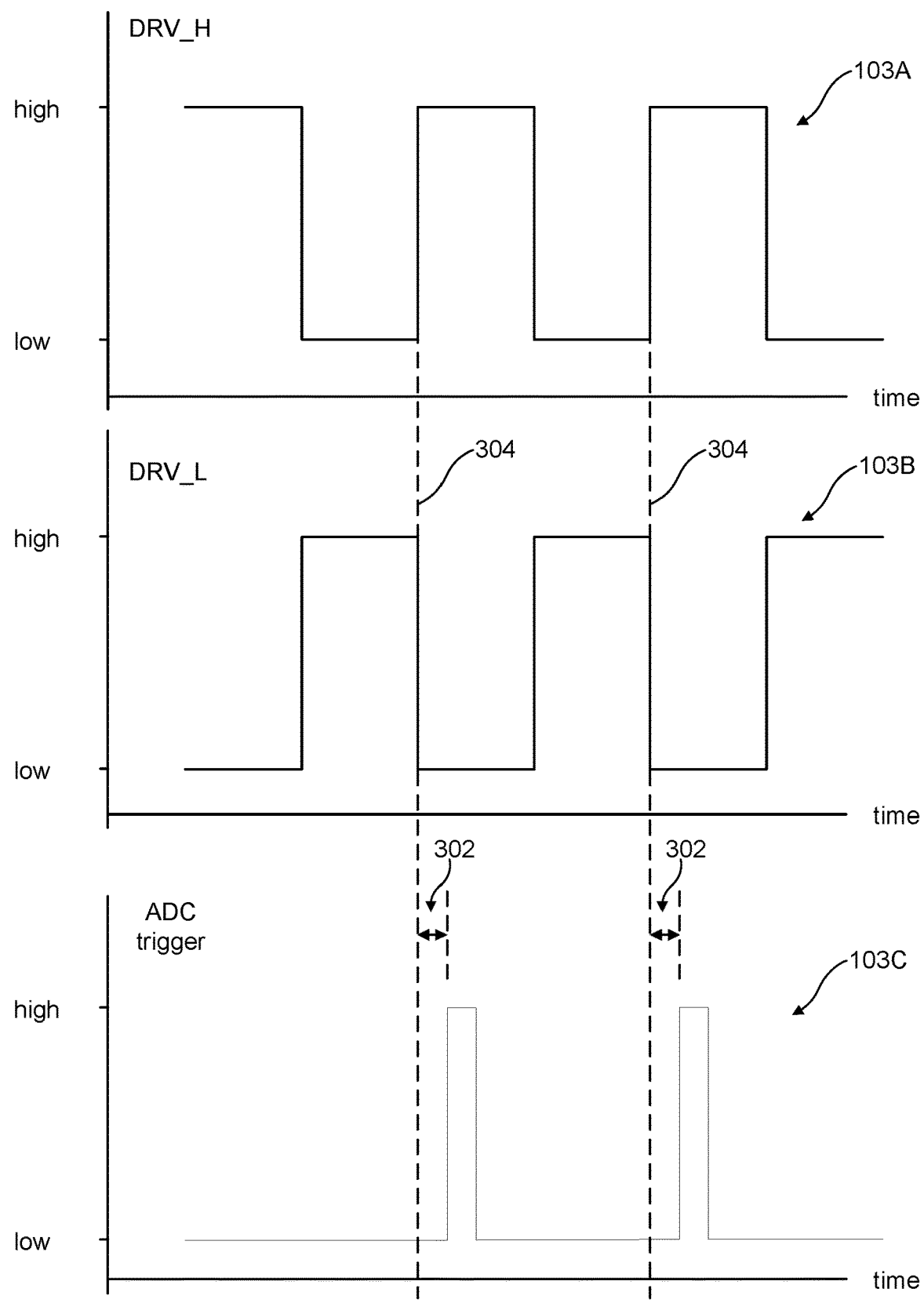
FIG. 3 is a set of timing diagrams illustrating exemplary relative timing of the differential-drive signals and ADC-sampling signals used in an exemplary sensor according to an aspect of the invention.

The timing of an exemplary trigger for sampling by the ADC 110 is depicted in FIG. 3. Here, the ADC-trigger signal 103C is shown relative to the DRV_H 103A and DRV_L 103B signals. This shows a phase-shift delay 302 of the trigger 103C relative to the zero-crossing points 304.

By driving the DVRT 106 at a high frequency (e.g., 500 kHz), it is possible to improve the throughput of the measurement (relative to lower frequency operation) while maintaining an appropriate signal-to-noise ratio and at the same time improve resolution of the measurement. For example, in one embodiment, the ADC 110 is measured 64 times in a row at a rate of 500 k samples per second (providing 64 synchronous measurements of the DVRT 106 signal at the center tap 106D). The first 16 samples are discarded to eliminate crosstalk/distortion; thus, the DC value of the signal at the center tap 106D is sampled 48 times. The 48 samples are grouped into three groups of 16. The samples in each group are summed and then divided by four to yield three numbers with four times the resolution of the samples (a gain of 2 bits of resolution). The three yielded numbers are then summed and the sum divided by 2 to yield an additional resolution gain of 50%. This decimation provides low pass filtering which improves the noise performance of the measurement. Other read rates and decimation schemes/factors may be used, as appropriate for the application (e.g., different numbers of transducers or different communications bandwidth may benefit from different sampling and decimation schemes). The high-speed measurement of a single sensor enables reading more sensors in a set time frame. Thus, for example, the high-frequency DVRT drive allows more caliper arms on a caliper logging tool without reducing the logging rate. The circumferential resolution of the measurement is increased without any increase in logging time.

Figure 4:
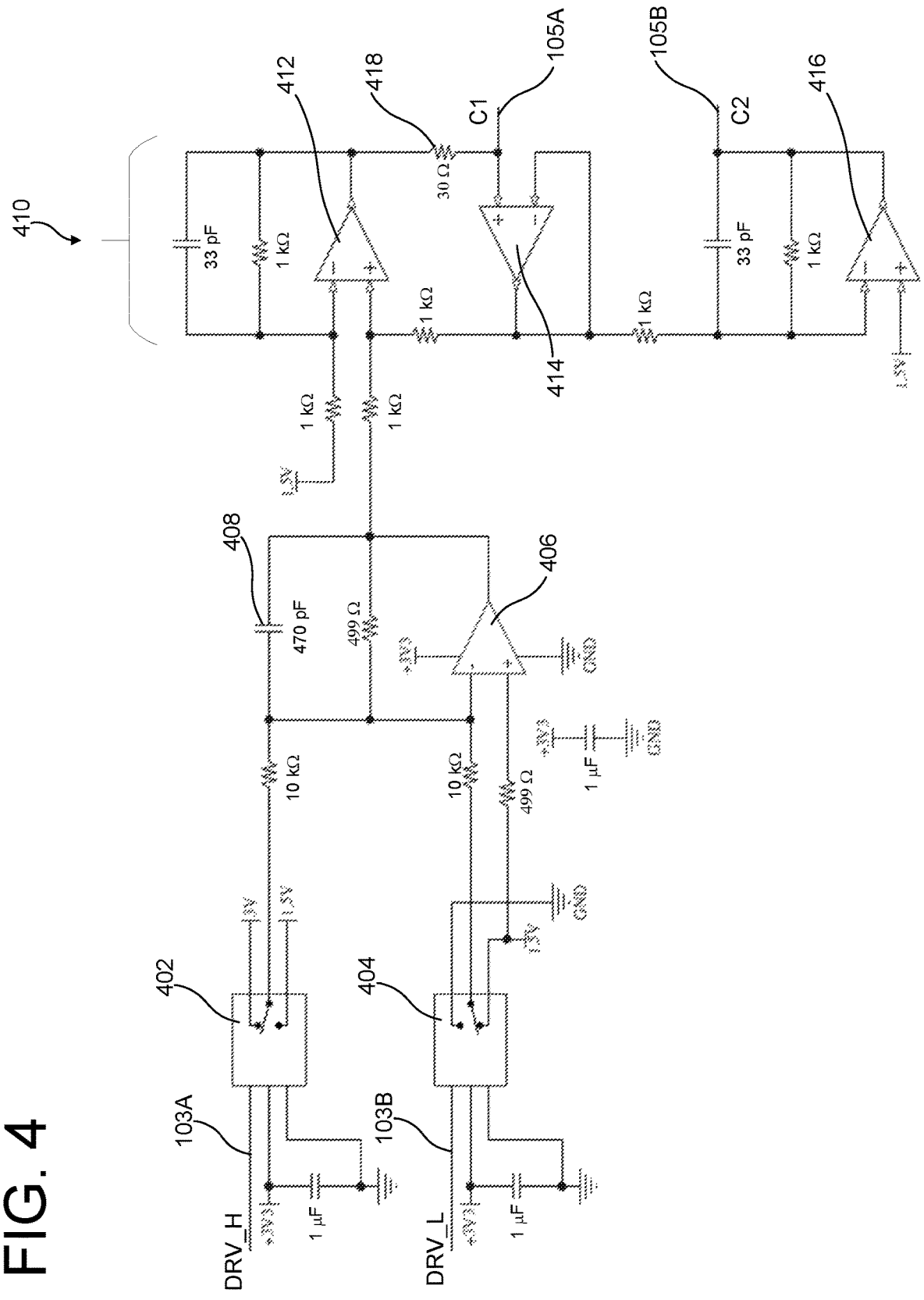
FIG. 4 is a circuit diagram illustrating an exemplary current pump used in an exemplary sensor according to an aspect of the invention.

An exemplary embodiment of current pump 104 is depicted in FIG. 4. The embodiment comprises two MUX switches 402, 404 that work in combination with an operational amplifier 406 to receive the DRV_H 103A and DRV_L 103B signals (as switch-position-selection signals) and therefrom generate a roughly sinusoidal signal at the output of the operational amplifier 406. A feedback capacitor 408 on the operational amplifier 406 bandwidth limits the drive signal to prevent ringing in the DVRT 106 and further provides a simple anti-alias filter for the ADC 110 to limit the spectrum of the signal at the center tap 106D that is sampled by the ADC 110.

The roughly sinusoidal signal at the output of the operational amplifier 406 drives a Howland current pump 410 comprising three operational amplifiers 412, 414, 416. One amplifier 412 is the controller amplifier for the pump. A second amplifier 414 is configured as a voltage follower which preserves the high output impedance of the pump while sourcing a low impedance signal for the pump current feedback and drive signal for the phase-splitter amplifier 416. The phase-splitter amplifier 416 is controlled by control amplifier 412 through a feedback signal across a resistor 418 to ensure true differential constant current operation. The Howland current pump 410 drives the differential drive signal 105A, 105B. This current drive is used to excite the DVRT 106 as it compensates for temperature changes in the resistance of the coils 106A, 106B. The current drive also compensates for changes in the on resistance of the MUX switches used to selectively connect the sensor circuitry to one of multiple transducers (as explained below).

Figure 5:
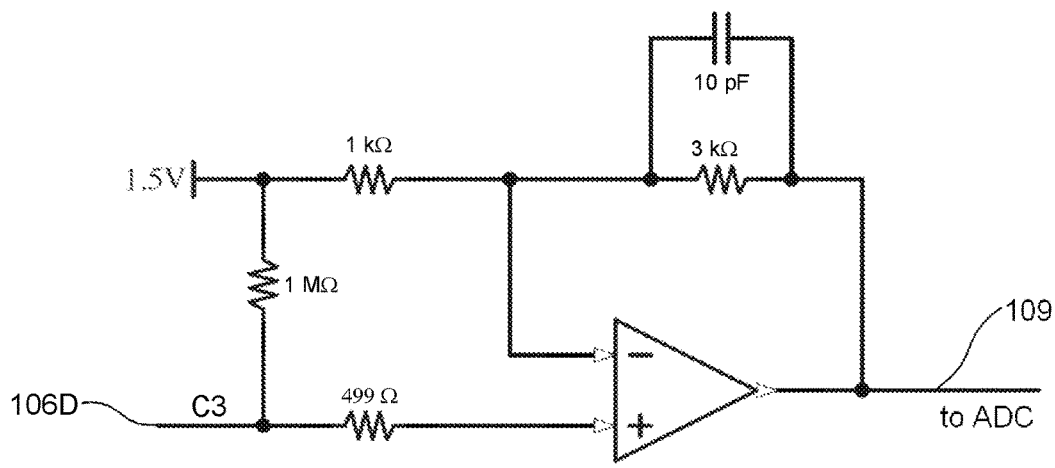
FIG. 5 is a circuit diagram illustrating an exemplary signal buffer used in an exemplary sensor according to an aspect of the invention.

An exemplary embodiment of the buffer 108 is depicted in FIG. 5. This embodiment scales the signal at center tap 106D in addition to buffering the signal for sampling by the ADC 110.

Figure 6:
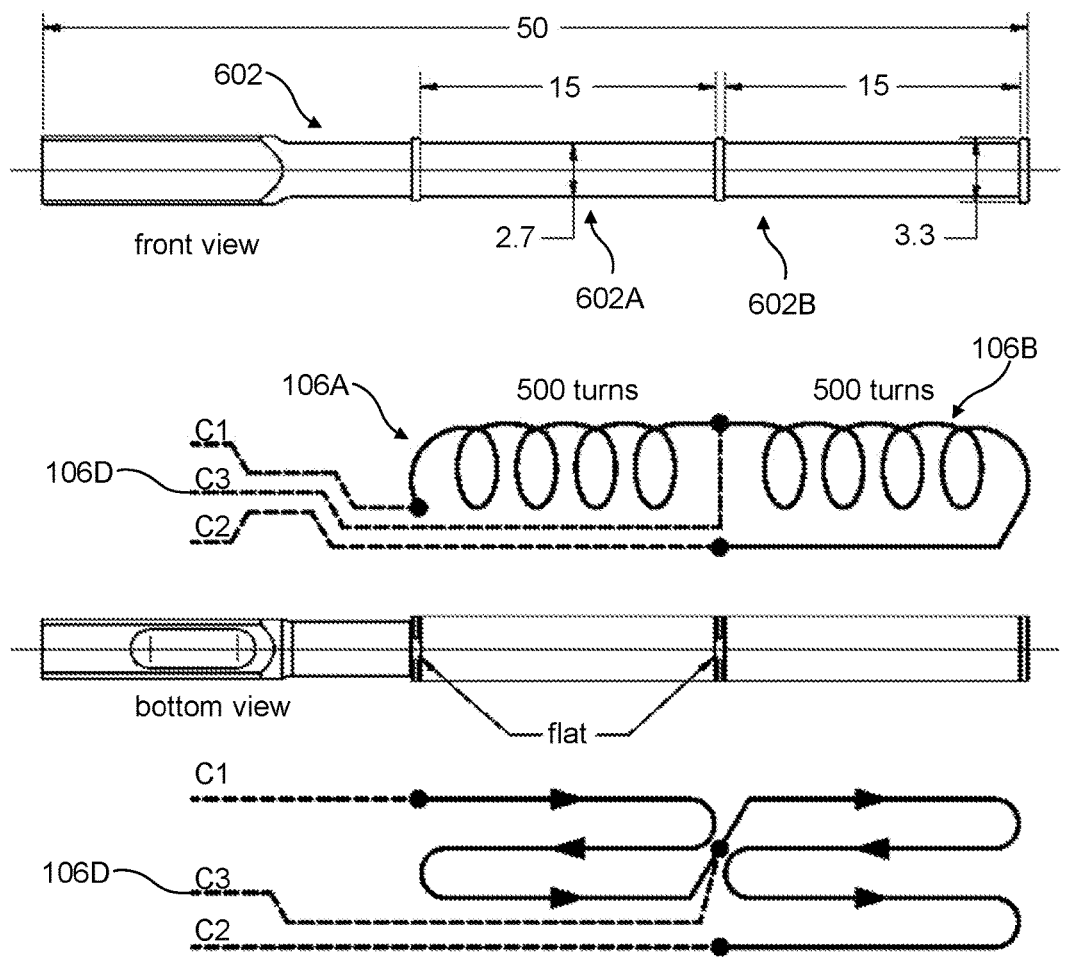
FIG. 6 is a set of views illustrating an exemplary coil assembly for a differential variable reluctance transducer used in an exemplary sensor according to an aspect of the invention.

An exemplary embodiment of the coil assembly of the DVRT 106 is depicted in the various views of FIG. 6. The exemplary coil assembly includes two coils 106A, 106B each comprising approximately 500 turns about a bobbin 602. The first coil 106A is wound about the bobbin 602 at a first portion of the bobbin 602A. The second coil 106B is wound about the bobbin 602 at a second portion of the bobbin 602B. The first and second portions 602A, 602B of the bobbin have the same dimensions. The dimensions shown in FIG. 6 are millimeters.

Figure 7:
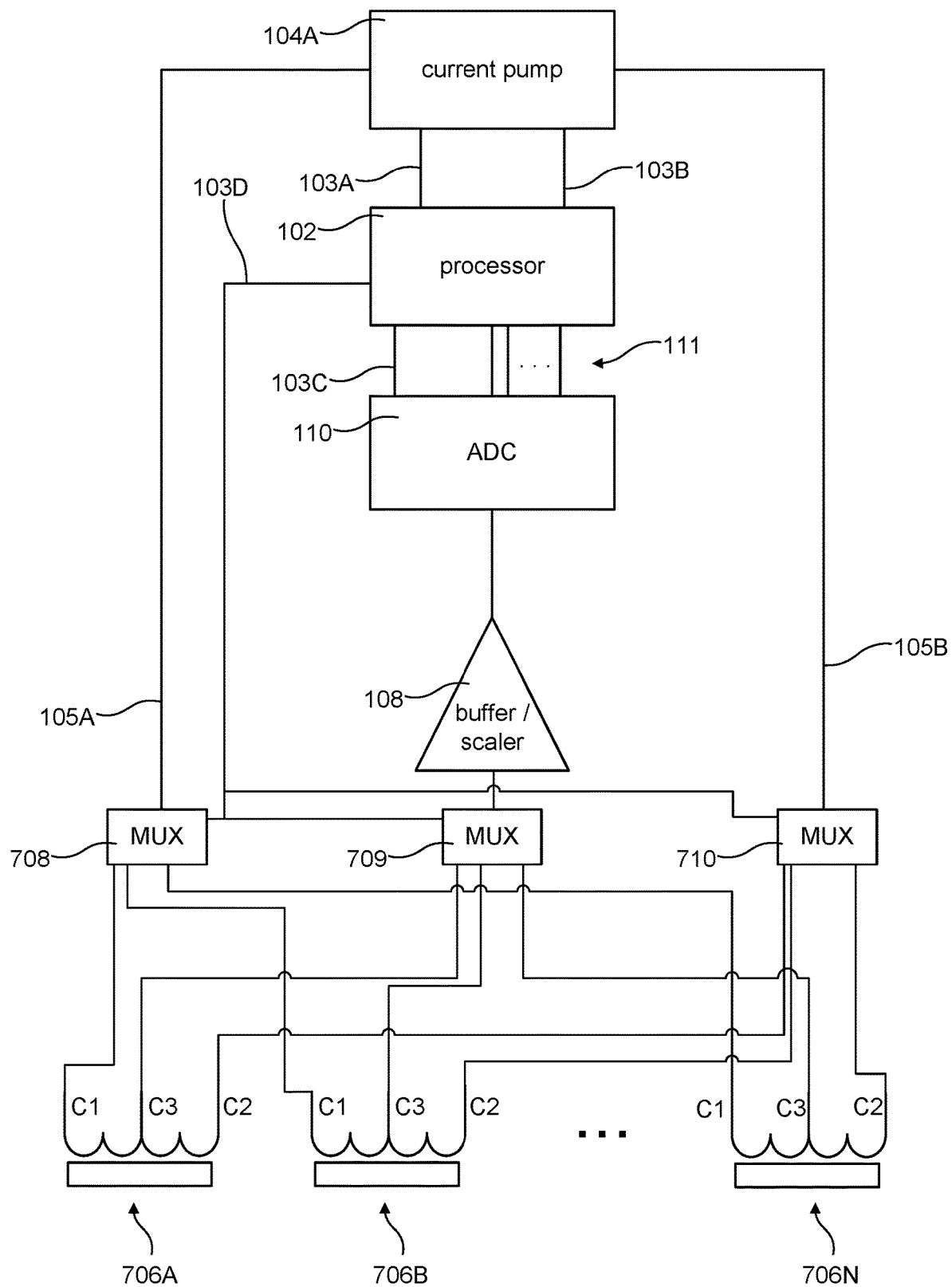
FIG. 7 is a block diagram illustrating an exemplary multi-transducer sensor circuit according to an aspect of the invention.

An exemplary caliper-arm-position sensor incorporating an embodiment of the invention is depicted in FIG. 7. This is similar to the embodiment depicted in FIG. 1, with the difference being that the FIG. 7 embodiment is configured with multiple transducers 706A, 706B, 706N supported by a single processing/drive circuit. As described above with respect to the DVRT 106 in FIG. 1, each DVRT in FIG. 7 includes three connection points, one at each end of the compound coil (C1, C2) and one at the center tap (C3). The DVRTs 706A, 706B, 706N are connected to the processing/drive circuit through three MUX switches 708, 709, 710, each switch corresponding to a DVRT connection point (C1, C2, C3) and each position in a switch corresponding to one of the DVRTs 706A, 706B, 706N. The position of each of the MUX switches 708, 709, 710 is controlled by the processor 102 through a bus 103D, thus the MUX switches 708, 709, 710 are used to select which of the multiple transducers 706A, 706B, 706N are accessed at a given time. While three transducers 706A, 706B, 706N are depicted in FIG. 7, more or fewer transducers may be incorporated into the embodiment. For example, for multi-arm caliper tools, there could be one transducer for each arm. Thus, a 60-arm tool would have 60 transducers and a 24-arm tool would have 24 transducers. Some portion or all of these transducers may be supported by a single processor, ADC, and current pump. For example, an embodiment of the circuit of FIG. 7 may support up to 16 transducers and multiple such circuits could be deployed in a multi-arm caliper tool with more than 16 transducers (e.g., 2 processing/drive circuits for a 24-arm tool).

Figure 8:
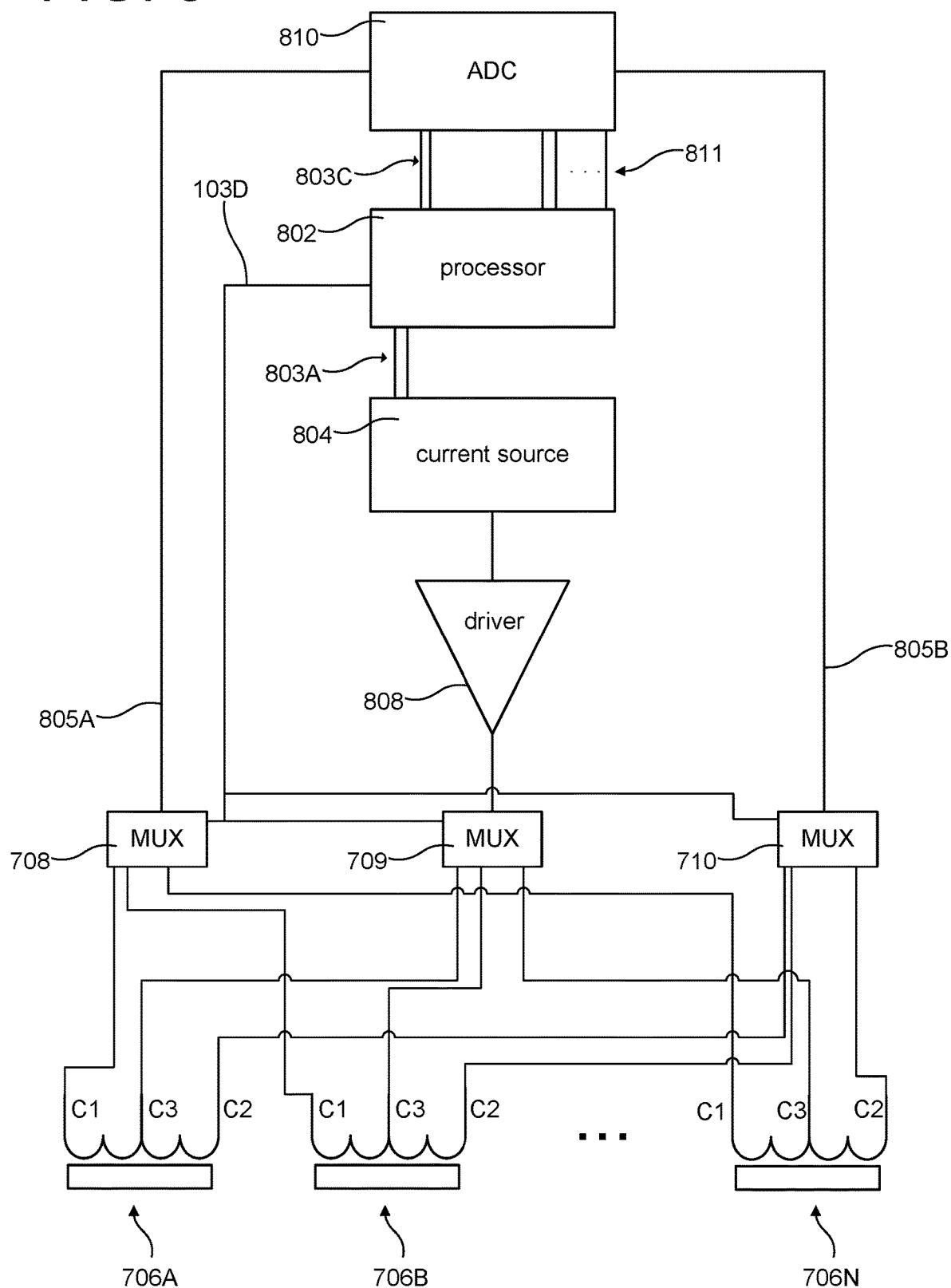
FIG. 8 is a block diagram illustrating an exemplary multi-transducer sensor circuit according to an aspect of the invention.

Another exemplary caliper-arm-position sensor incorporating an embodiment of the invention is depicted in FIG. 8. This is similar to the embodiment depicted in FIG. 7, with the difference being that each of the DVRTs 706A, 706B, 706N is current driven at the compound coil's center tap (C3) rather than at the coil's ends (C1, C2). In this embodiment, a processor 802 controls a current source 804 through a control line(s) or bus 803A in order to provide current to the selected DVRT 706A, 706B, 706N. For example, the DVRT coil may be driven at the center tap with one of the output-voltage signals 105A, 105B depicted in FIG. 2. The processor 802 controls a MUX switch 709 through a bus 103D to selectively provide the drive current to a DVRT. A driver 808 may optionally be disposed between the current source 804 and the MUX switch 709. In this embodiment, the signals at the coil ends (C1, C2) 805A, 805B of the MUX-selected DVRT are sampled by an ADC 810 controlled by the processor 802 through a control line(s) or bus 803C. The processor may analyze the difference between the two end signals 805A, 805B through, for example, software or programmable logic implementing a differencing algorithm. The resulting differential signal is indicative of the core position in the DVRT.

Figure 9:
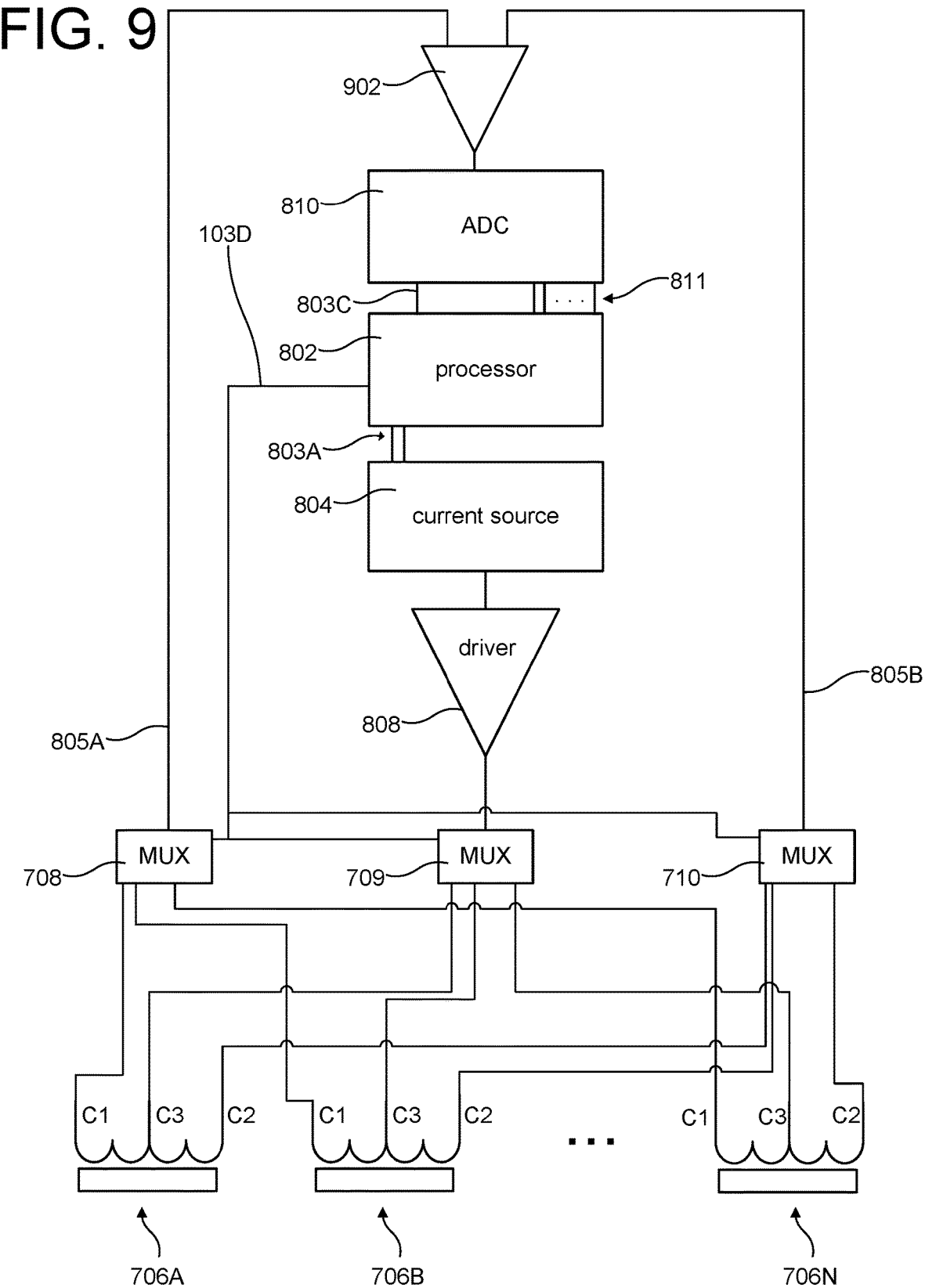
FIG. 9 is a block diagram illustrating an exemplary multi-transducer sensor circuit according to an aspect of the invention.

Another exemplary caliper-arm-position sensor incorporating an embodiment of the invention is depicted in FIG. 9. This is similar to the embodiment depicted in FIG. 8, with the difference being that the signals at the coil ends (C1, C2) 805A, 805B are first processed by a differential receiver 902 and the resulting differential signal is digitized by the ADC 810. The resulting differential signal is indicative of the core position in the DVRT.

While the foregoing description is directed to the preferred embodiments of the invention, other and further embodiments of the invention will be apparent to those skilled in the art and may be made without departing from the basic scope of the invention. And features described with reference to one embodiment may be combined with other embodiments, even if not explicitly stated above, without departing from the scope of the invention. The scope of invention is defined by the claims which follow.

The invention claimed is:

1. A sensor comprising:
   (a) a transducer comprising:
      (i) a coil having a first-end connection, a second-end connection, and a center-tap connection, and
      (ii) a core positioned adjacent to the coil,
      (iii) wherein the coil and core may move relative to each other;
   (b) a driving means for driving the coil with a differential sinusoidal constant-current signal across the coil, the driving means having first and second output connections wherein the first output connection is connected to the coil's first-end connection and the second output connection is connected to the coil's second-end connection;
   (c) an analog-to-digital converter connected to the coil's center-tap connection; and
   (d) a triggering means for triggering the analog-to-digital converter to sample a signal at the center tap of the coil at a predetermined time following a zero-crossing point of the differential sinusoidal constant-current signal.

2. The sensor of claim 1 further comprising three MUX switches wherein:
   (a) the driving mean's first output connection is connected to coil's first-end connection through the first MUX switch;
   (b) the driving mean's second output connection is connected to coil's second-end connection through the second MUX switch; and
   (c) the analog-to-digital converter is connect to the coil's center-tap connection through the third MUX switch.

3. The sensor of claim 1 wherein the driving means includes:
   (b) a first circuit configured to generate a square drive signal comprising a square wave and the phase complement of the square wave;
   (c) a second circuit configured to convert the square drive signal to a sinusoidal drive signal; and
   (d) a Howland current-pump circuit configured to use the sinusoidal drive signal to generate the differential sinusoidal constant-current signal.

4. A caliper-arm-position sensor comprising:
   (a) a compound coil comprising:
      (i) a first coil having a first end connection and a second end connection, and
      (ii) a second coil having a first end connection and a second end connection,
      (iii) wherein the second end connection of the first coil is electrically connected to the first end connection of the second coil;
   (b) a core positioned adjacent to the coil;
   (c) a caliper arm mechanically connected to the core;
   (d) a voltage driver having an alternating-voltage output signal electrically connected to at least one of the group consisting of the first end connection of the first coil, the second end connection of the first coil, and the second end connection of the second coil;
   (e) an analog-to-digital converter electrically connected to at least one of the group consisting of the first end connection of the first coil, the second end connection of the first coil, and the second end connection of the second coil; and
   (f) a timer with an output electrically connected to the analog-to-digital converter, wherein the output of the timer is configured to trigger sampling by the analog-to-digital convertor at a predetermined period of time relative to a phase point of the alternating-voltage output signal.

5. The caliper-arm-position sensor of claim 4 wherein the voltage driver is a differential-voltage driver having an alternating-voltage output signal electrically connected to the first end connection of the first coil and a phase-shifted version of the alternating-voltage output signal electrically connected to the second end connection of the second coil; and the analog-to-digital convertor is electrically connected to the second end connection of the first coil.

6. The sensor of claim 5 wherein the phase-shifted version of the alternating-voltage output signal is shifted by approximately 180 degrees relative to the alternating-voltage output signal.

7. The caliper-arm-position sensor of claim 4 wherein the voltage driver is a single-ended voltage driver having an alternating-voltage output signal electrically connected to the second end connection of the first coil; and the analogto-digital convertor is electrically connected to the first end connection of the first coil and to the second end connection of the second coil.

8. The caliper-arm-position sensor of claim 4 wherein the voltage driver is a single-ended driver having an alternating-voltage output signal electrically connected to the second end connection of the first coil; and the analog-to-digital convertor is electrically connected to the first end connection of the first coil and to the second end connection of the second coil through a differential receiver.

9. The sensor of claim 4 wherein the alternating-voltage output signal of the voltage driver is constant current.

10. The sensor of claim 4 further comprising a bobbin, wherein the first coil includes a wire wound about a first portion of the bobbin a first number of turns and the second coil includes a wire wound about a second portion of the bobbin a second number of turns.

11. The sensor of claim 10 wherein the first number of turns and the second number of turns are substantially the same.

12. The sensor of claim 10 wherein the first portion of the bobbin and the second portion of the bobbin have substantially the same dimensions.

13. The sensor of claim 4 further including a processor electrically connected to the analog-to-digital convertor.

14. The sensor of claim 4 wherein the timer circuit is implemented in a processor.

15. The sensor of claim 4 wherein the alternating-voltage output signal of the voltage driver has a frequency of at least approximately 500 kHz.

16. The sensor of claim 4 wherein the alternating-voltage output signal of the voltage driver has a frequency that is within about 20% of a self-resonant frequency of the compound coil when the coil is adjacent to the core.

17. A method of determining a caliper-arm position, the method comprising:

(a) providing a differential variable reluctance transformer comprising:
  (i) a coil with a first end, a second end, and a center tap, and
  (ii) a core positioned adjacent to the coil and mechanically connected to a caliper arm;
(b) providing an alternating-voltage signal to at least one of the group consisting of the first end of the coil, the second end of the coil, and the center tap of the coil;
(c) providing an analog-to-digital converter electrically connected to at least one of the group consisting of the first end of the coil, the second end of the coil, and the center tap of the coil;
(d) providing a timer with an output electrically connected to the analog-to-digital converter, wherein the output of the timer is configured to trigger sampling by the analog-to-digital convertor at a predetermined period of time relative to a phase point of the alternating-voltage signal;
(e) triggering sampling by the analog-to-digital convertor at a predetermined time relative to a phase point of the alternating-voltage signal using the timer, whereby the sampling provides a measure of voltage at one or more of the points in the group consisting of the first end of the coil, the second end of the coil, and the center tap of the coil;
(f) estimating the position of the core relative to the coil using the measure of voltage; and
(g) estimating the position of the caliper arm using the estimated position of the core.

18. The method of claim 17 wherein the differential variable reluctance transformer has a self-resonant frequency and the alternating-voltage signal has a frequency about 10% lower than the self-resonant frequency.

* * * * *